Nov. 11, 1947.  C. H. DAVIS, JR  2,430,630

METHOD OF JOINING THE ENDS OF RUBBER TUBES

Filed Oct. 20, 1944

Inventor

Charles H. Davis, Jr.

By Clarence A. O'Brien
and Harvey B. Jacobson
Attorneys

Patented Nov. 11, 1947

2,430,630

UNITED STATES PATENT OFFICE 2,430,630

METHOD OF JOINING THE ENDS OF RUBBER TUBES

Charles H. Davis, Jr., East Gadsden, Ala.

Application October 20, 1944, Serial No. 559,586

7 Claims. (Cl. 154—14)

This invention relates to a new and useful method of joining the ends of tubes made at least partially of synthetic rubber, and the method is particularly designed for use in the manufacture of endless rubber tubes such as are used within the casings of pneumatic vehicle tires.

The primary object of the present invention is to provide a method whereby the abutting ends of a tube may be effectively held in abutting relation and thereby prevented from separating during the curing process, thereby making it entirely satisfactory and practical to butt splice, by machine, the ends of tubes made at least partially of synthetic rubber.

Figure 1:
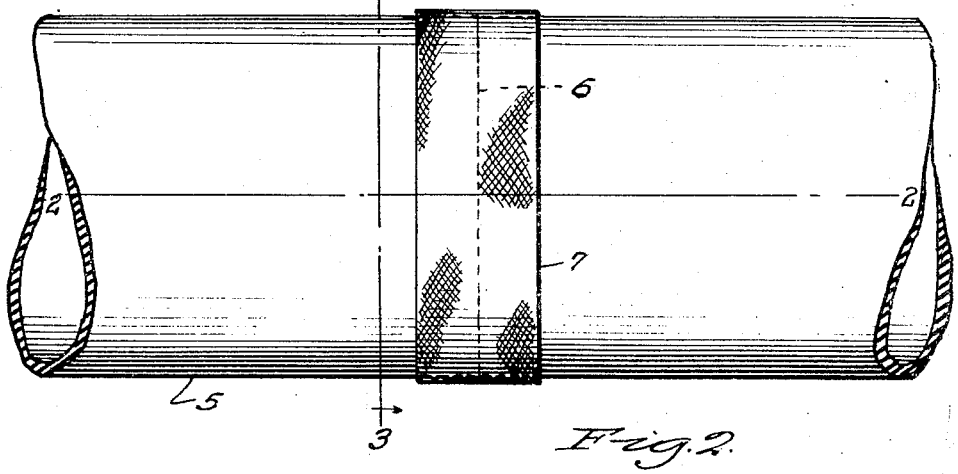
Figure 1 is a fragmentary elevation showing the ends of a tube held together in accordance with the present invention.
Figure 2:
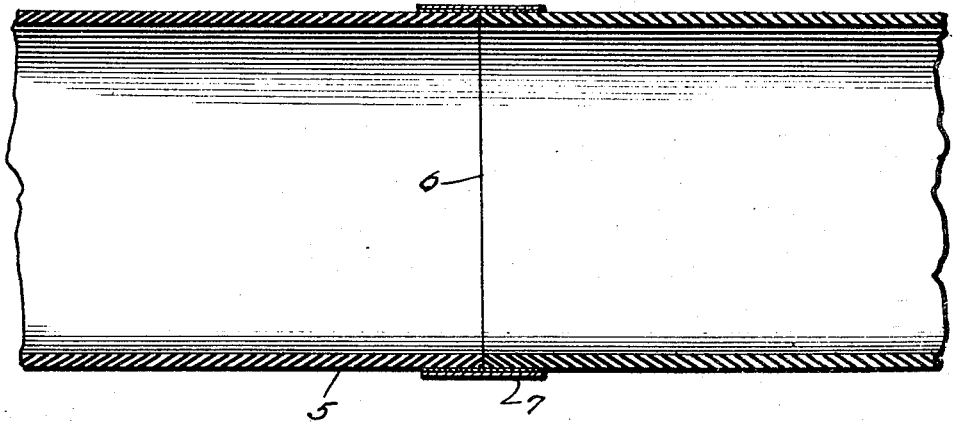
Figure 2 is a section on line 2—2 of Figure 1.
Figure 3:
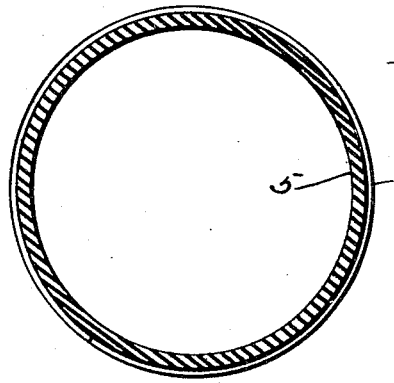
Figure 3 is a transverse section on line 3—3 of Figure 1.

In carrying out the present method, the ends of the uncured rubber tube 5, which is made at least partially of synthetic rubber, are disposed in abutting relation, as at 6. A strip of Holland cloth 7 or other equivalent non-stretching material which will not permanently stick to the tube during the curing process is cemented around the ends of the tube 5 so as to span the joint 6 at the meeting end edges of the tube and to extend substantially equal distances beyond opposite sides of said joint. The strip 7 is preferably made of a width to extend from one-half inch to one inch beyond either side of the joint 6, depending upon the size of the tube to be cured and spliced. The non-stretching strip 7, which is widely used in the rubber industry because uncured rubber will not permanently stick to it, will effectively hold the ends of the tube in abutting relation during the curing process and while the tube is subjected to heat and internal pressure in the usual way. After application of the strip 7, the tube is subjected to this curing process, and after the cure is completed, the non-stretching strip 7 my be readily peeled off of the tube and discarded. The strip 7 leaves only a slight indentation in the tube at the joined ends of the latter, and that in no way affects the quality of the tube.

By means of the above-described method, it is possible to machine splice and cure tubes that are made at least partially of synthetic rubber and which have heretofore only been spliced by the lap or hand splice method. The strip 7 effectively absorbs all of the strain of the curing process and does not allow the two ends of the splice to separate under the heat and pressure of the curing process.

From the foregoing description, it is believed that the nature and advantages of the present invention will be readily understood and appreciated by those skilled in the art.

What I claim is:

1. The herein described method of joining the ends of an inner tube made wholly of rubber and of uniform thickness throughout, and wherein the rubber is at least partially synthetic, which method consists of butting the free end edges of the tube with the ends of the tube in unfolded non-overlapped relation, placing and temporarily cementing a strip of non-stretching cloth around the outside of the ends of the tube so as to span the joint at the butted end edges, curing the entire tube by the application of heat and internal pressure throughout the same so as to cause the end edges of the tube to be vulcanized together, and then peeling the strip of cloth from the tube.

2. The herein described method of joining the ends of an inner tube made wholly of rubber and of uniform thickness throughout, and wherein the rubber is at least partially synthetic, which method consists of butting the free end edges of the tube with the ends of the tube in unfolded non-overlapped relation, placing and temporarily cementing a strip of cloth around the outside of the ends of the tube so as to span the joint at the butted end edges, curing the entire tube by the application of heat and internal pressure throughout the same so as to cause the end edges of the tube to be vulcanized together and then peeling the strip of cloth from the tube.

3. A method of splicing two portions of rubber which consists in arranging said portions, while in uncured state, with the edges thereof in contacting relation, in wrapping the contacting portions of the rubber with a binding tape, the contacting surface of which is cemented to the rubber and which will not permanently stick to the same during the curing process, in then curing the wrapped rubber, and in then stripping the tape from the cured rubber.

4. A method of splicing two hollow portions of rubber which consists in arranging said portions, while in uncured state, with the edges thereof in contacting relation, in wrapping the contacting portions of the rubber with a strip cemented thereto, the inner surface of which will not permanently stick, adhere or vulcanize to the rubber, in then curing the wrapped rubber, and in then stripping the strip from the cured rubber.

5. The herein described method of joining the ends of an inner tube made wholly of rubber, which method consists of butting the free end edges of the tube with the ends of the tube in unfolded non-overlapped relation, placing and temporarily cementing a strip of material which will not permanently stick to the tube during the curing process around the outside of the ends of the tube so as span the joint at the butted end edges, curing the tube so as to cause the end edges of the tube to be vulcanized together, and in then peeling the strip of material from the tube.

6. A method of splicing two hollow portions of rubber stock which consists in preliminarily assembling said portions with the ends thereof in contacting relation, in cementing a tape over the outer spliced region of the assembled portions of the rubber stock to maintain the joint therebetween intact preparatory to curing the same, the adhered surface of said tape being such that it will not permanently stick to the spliced rubber stock when cured, in then curing the tape-covered joint, and in finally stripping the tape from the cured joint.

7. The herein described method of joining the ends of an inner tube made wholly of rubber and of uniform thickness throughout, and wherein the rubber is at least partially synthetic, which method consists of butting the free end edges of the tube with the ends of the tube in unfolded non-overlapped relation, placing and temporarily cementing a strip of binding tape about the outside of the ends of the tube so as to span the joint at the butted end edges, the inner surface of said tape being such that it has no vulcanizing affinity for the rubber of the tube. curing the tube so as to cause the end edges of the tube to be vulcanized together, and then peeling the strip of binding tape from the tube.

CHARLES H. DAVIS, Jr.

REFERENCES CITED

The following references are of record in the file of this patent:

UNITED STATES PATENTS

| Number | Name | Date |
|---|---|---|
| 1,402,492 | Grote | Jan. 3, 1922 |
| 528,056 | Woodward | Oct. 23, 1894 |

FOREIGN PATENTS

| Number | Country | Date |
|---|---|---|
| 175,484 | Great Britain | Feb. 23, 1922 |